US006615058B2

(12) United States Patent
Nagai

(10) Patent No.: US 6,615,058 B2
(45) Date of Patent: *Sep. 2, 2003

(54) PORTABLE PHONE DEVICE

(75) Inventor: Michio Nagai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,055

(22) Filed: Sep. 16, 1997

(65) Prior Publication Data

US 2002/0068619 A1 Jun. 6, 2002

(30) Foreign Application Priority Data

Sep. 19, 1996 (JP) .............................................. 8-247396

(51) Int. Cl.[7] .............................. H04B 1/38; H04M 1/00
(52) U.S. Cl. ..................... 455/566; 455/90; 379/428.01
(58) Field of Search .......................... 455/90, 566, 572, 455/575, 351; 429/9, 97, 123; 379/434, 428, 440; D14/138, 140, 141, 142

(56) References Cited

U.S. PATENT DOCUMENTS

| | | | | |
|---|---|---|---|---|
| 4,847,887 A | * | 7/1989 | Suzuki et al. | 455/569 |
| 5,175,759 A | * | 12/1992 | Metroka et al. | 379/58 |
| 5,572,573 A | * | 11/1996 | Sylvan et al. | 379/61 |
| 5,742,894 A | * | 4/1998 | Jambhekar et al. | 455/90 |
| 5,766,794 A | * | 6/1998 | Brunette et al. | 429/97 |
| 5,857,148 A | * | 1/1999 | Weisshappel et al. | 455/90 |
| 5,991,644 A | * | 11/1999 | Ogawa | 455/566 |
| 6,073,027 A | * | 6/2000 | Norman et al. | 455/550 |
| 6,157,718 A | * | 12/2000 | Kaschke | 379/433 |

FOREIGN PATENT DOCUMENTS

| | | |
|---|---|---|
| EP | 0663734 A1 | 1/1995 |
| EP | 0664504 A2 | 1/1995 |
| EP | 0713313 A1 | 5/1996 |
| GB | 2280332 A | 7/1993 |
| GB | 2302232 A | 5/1996 |
| JP | 06-061910 | 3/1994 |
| JP | 6-244912 | 9/1994 |
| JP | 07-095651 | 4/1995 |
| JP | 7-131848 | 5/1995 |
| JP | 07288855 A | 10/1995 |
| JP | 09-062198 | 3/1997 |
| WO | WO 94/13088 | 6/1994 |
| WO | WO 95/13665 | 9/1994 |

OTHER PUBLICATIONS

Radio Shack Catalog 1996 p. 26 Ericsson fold–out cellular phone AH–210.*

* cited by examiner

Primary Examiner—Edward F. Urban
Assistant Examiner—S. Smith
(74) Attorney, Agent, or Firm—Scully, Scott, Murphy & Presser

(57) ABSTRACT

A personal communication device is folded for compact portability, yet allows viewing of certain essential data such as caller phone number, signal sensitivity, cell boundaries, battery life and messages, without unfolding the phone as well as accessing important function keys. This is made possible by arranging a part of the display section to be in view even when the phone is folded for carrying. When the ear piece of the phone is opened for telephoning, the overall length of the phone is such that the mouth section is opposite to the user's mouth. In the basic design the receiver is located in the movable ear piece so that its length can be kept short. The keyboard section can be located on any surface of the main body of the phone, and an example shows a side mounted keyboard section, thus allowing to operate the phone without unfolding the phone. A liquid crystal touch panel for display section is convenient because it can fulfill both functions of display and keyboard section while retaining the features of a compact size and an ability to operate in the folded condition.

12 Claims, 8 Drawing Sheets

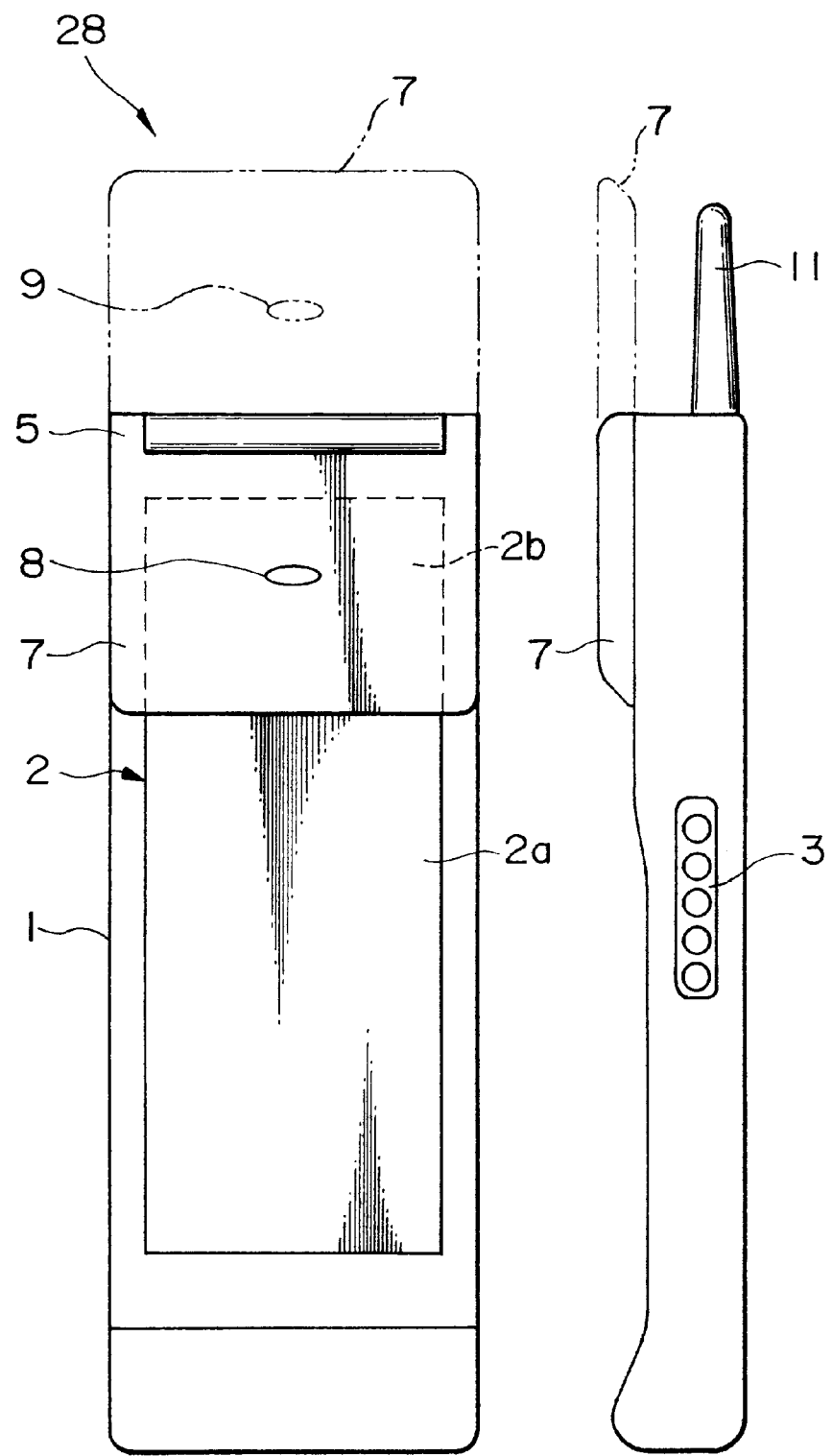

PORTABLE PHONE DEVICE

BACKGROUND OF THE INVENTION

1. Field of the Invention

The present invention relates to portable communication devices, and relates in particular to a personal phone device having improved operational features.

2. Description of the Related Art

In general, a portable phone device comprises a radio unit, a receiver, a transmitter, keyboard section and, a display section. The phone is designed to be portable so that the overall length of the phone accommodates the receiver fitting over the ear and the transmitter locating near the mouth of the user. The result is a somewhat bulky unit detracting from its portability. For this reason, some portable phones are designed to fold in such a way that the casing with the transmitter and the display unit is hinged to another casing with the receiver and the keyboard section so that the two sections can be freely folded for portability and unfolded for communication.

FIG. 6 is an illustration of such a conventional portable phone unit disclosed in a Japanese Patent Application, First Publication, H4-307841. The phone unit 21 shown in FIG. 6 comprises a first casing member 31 and a second casing member 32 freely rotatably connected to the first casing member 31 through a hinge section 24. The first casing member 31 comprises a speaker section 22 having an internal transmitter and the keyboard section 23. With respect to the top connecting end, at the transverse hinge section 24, of the first casing member 31, the speaker section 22 is at the bottom end of the unit, and the keyboard section 23 occupies a fairly large longitudinal portion of the total device area. The second casing member 32 extends away from the hinge section 24, and comprises a listening section 25, with its internal receiver device, and a display section 26 near the hinge section 24.

The second casing member 32 is freely hinged to enable the member 32 to swing in the direction ①, ② indicated by a bi-directional arrow enabling the second casing member 32 to be housed in the keyboard section of the first casing member 31 to make the phone unit convenient for carrying. When the second casing member 32 is housed in the first casing member 31, the keyboard section 23 and the display section 26 are all hidden from the user's view. When the second casing member 32 is rotated in the direction of ②, the keyboard section 23 and the display section 26 become visible and the unit is ready for use.

FIG. 7 shows another example of a the conventional portable phones disclosed in Japanese Patent Application, First Publication, H8-163219. This phone unit 40 comprises a first casing member 41, a second casing member 44 and a third casing member 45, where both of the latter two casing members are rotatably attached to the first casing member 41 with respective hinge sections 42, 43. The width dimensions of the second and third casing member 44, 45 are the same as the width dimension of the first casing member 41, but their length dimensions are shorter. By rotating the second and third casing members 44, 45 away from each other, about the hinge members 42, 43, the unit is made to open for use, as illustrated in FIG. 8, by exposing the front panel of the first casing member 41. By rotating the second and third casing members 44, 45 towards each other, the front panel of the casing member 41 is closed.

The first casing member 41 is provided with a display section 46 including a liquid crystal display (LCD) occupying approximately over its entire front surface, and an antennae 47 is provided on its top end surface.

The second casing member 44 is provided with an external listening section 48. The third casing member 45 is provided with a keyboard section 49 on its inside surface, and a speaker section 50 at the tip end of the inside surface.

By folding the second and third casing members 44, 45 to contact the first casing member 41, the overall length of a folded phone unit becomes the same as that of the first casing member 41, and the phone unit is ready for carrying.

To use the phone unit, only the third casing member 45 is opened, as illustrated in FIG. 9, and the user places his ear on the listening section 48 of the second casing member 44 in its closed position, and speaks through the speaker section 50 disposed at the tip of the third casing member 45. In this condition, the keyboard section 49 is accessible, and the user is able to phone out using the keyboard section 49, and the user is able to confirm any information from the lower section 46a of the display section 46. In this condition, the upper section 46b of the display section 46 of the first casing member 41 is hidden by the second casing member 44.

When using the unit for data transmission, the second and third casing members 44, 45 are opened so that the entire surface of the display section 46 of the first casing member becomes visible and data communication is carried out by operating the function keys while viewing a number of information on the display section 46.

One of the problems with the conventional devices presented above is that, in the case of the phone device 21 shown in FIG. 6 for example, the device is being carried by folding the second casing member 32 on the keyboard section 23, so that the keyboard section 23 and the display section 26 are entirely hidden from view by the second casing member 32, and it is not possible to operate the keyboard section 23. The same problem is encountered in the phone device 40 shown in FIGS. 7~9 such that when the device is being carried by folding the second and third casing members 44, 45 on the first casing member 41, the keyboard section 49 and the display section 46 are entirely hidden from view and the keys cannot be operated. For this reason, when it is necessary to power on the device to be in a call standby mode, the folded device must be opened to turn on the power. Also, when a call tone is received while the phone device is being carried in the standby mode, the user must open the folded phone device to change over the device to the transmission mode, making it difficult to change to the transmission mode quickly. Furthermore, transmission operation cannot be performed unless the device is first unfolded to access the keyboard, such as entering the destination phone number, making operation of the device cumbersome in many cases. Further, although by folding the phone unit, the overall length of the folded device becomes about half of the unfolded length, but the thickness of the folded device is increased by the component pieces, and it is not necessarily certain that portability is superior.

On the other hand, even when the device is being carried and not being used for transmission, sometimes the user need to know some information, such as identity of the caller, signal sensitivity, cell boundaries, battery life remaining and the presence of phone messages. However, the conventional phone devices 21, 40 do not permit the user to check the display, because the display sections 26, 46 are entirely hidden from view in the folded carrying condition.

SUMMARY OF THE INVENTION

It is an object of the present invention to provide a portable phone device to enable viewing the function keys and a minimum necessary display area even when the device is folded so that the functionality is improved without compromising portability.

The object has been achieved in a portable phone device comprising: a first casing member and a second casing member freely rotatably joined to the first casing member about a transverse rotation axis disposed in a plane containing the first casing member, wherein a longitudinal dimension of the first casing member is different from a longitudinal length of the second casing member, and the first casing member includes first component parts including at least a display section, a keyboard section, a transmitter section and a part of a receiver section, and the second casing member includes other component parts excluding the first component parts.

Accordingly, by folding the second casing member over the first casing member, the phone device is made shorter for ease of carrying. Further, when the phone is in the folded position, the two members do not superimpose totally so that function keys can be accessed through an available viewable area to facilitate certain operations such as power on/off, mode switching, and message dispatching and the like.

In a variation of the basic design, the display section and the operational section can be located on different surfaces, thus making the function keys accessible to enable to perform communication operations even when the phone is in the folded condition.

Furthermore, by using a liquid crystal touch panel for the keyboard section, the display and keyboard functions can be combined in one location so that the size of the operational area can be reduced significantly to make the phone device even more compact, compared with the conventional personal communication devices having separate display and keyboard sections.

BRIEF DESCRIPTION OF THE DRAWINGS

FIGS. 3A–3B are a plan view and a side view, respectively, of a second embodiment of the portable phone device of the present invention.

DESCRIPTION OF THE PREFERRED EMBODIMENTS

In the following, preferred embodiments will be presented with reference to the drawings.

Figure 1:
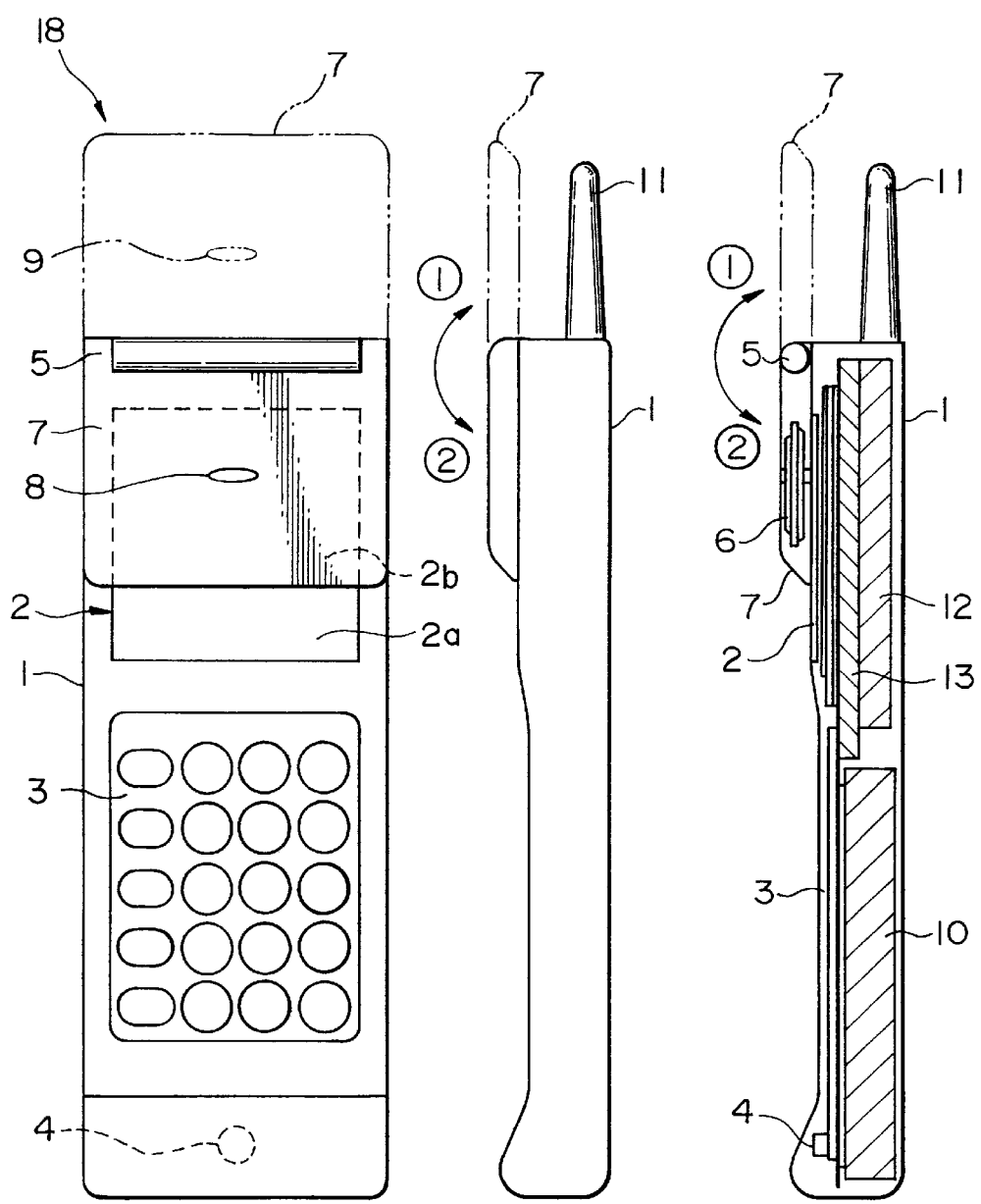
FIGS. 1A–1C are a plan view, a side view and a schematic internal view, respectively, of a first embodiment of the portable phone device of the present invention.

As shown in FIGS. 1A–1C, the portable phone device 18 comprises a casing member 1 and a movable casing member 7 which is rotatably joined to the casing member 1 through a hinge section 5 disposed transversely to the longitudinal direction of the phone device 18. On the surface of the casing member 1, there are provided a display section 2, a keyboard section 3 and a transmission device 4 successively below the hinge section 5. A receiver device 6 is disposed on the movable casing member 7. An antenna 11 is provided on the exterior of the casing member 1 while on the interior of the casing member 1, and on the interior section of the casing member 1, there are provided a battery 10, radio circuit 12 and a control circuit 13, as shown in FIG. 1C. However, the locations of these component members need not be limited to those shown in FIG. 1C.

Figure 2:
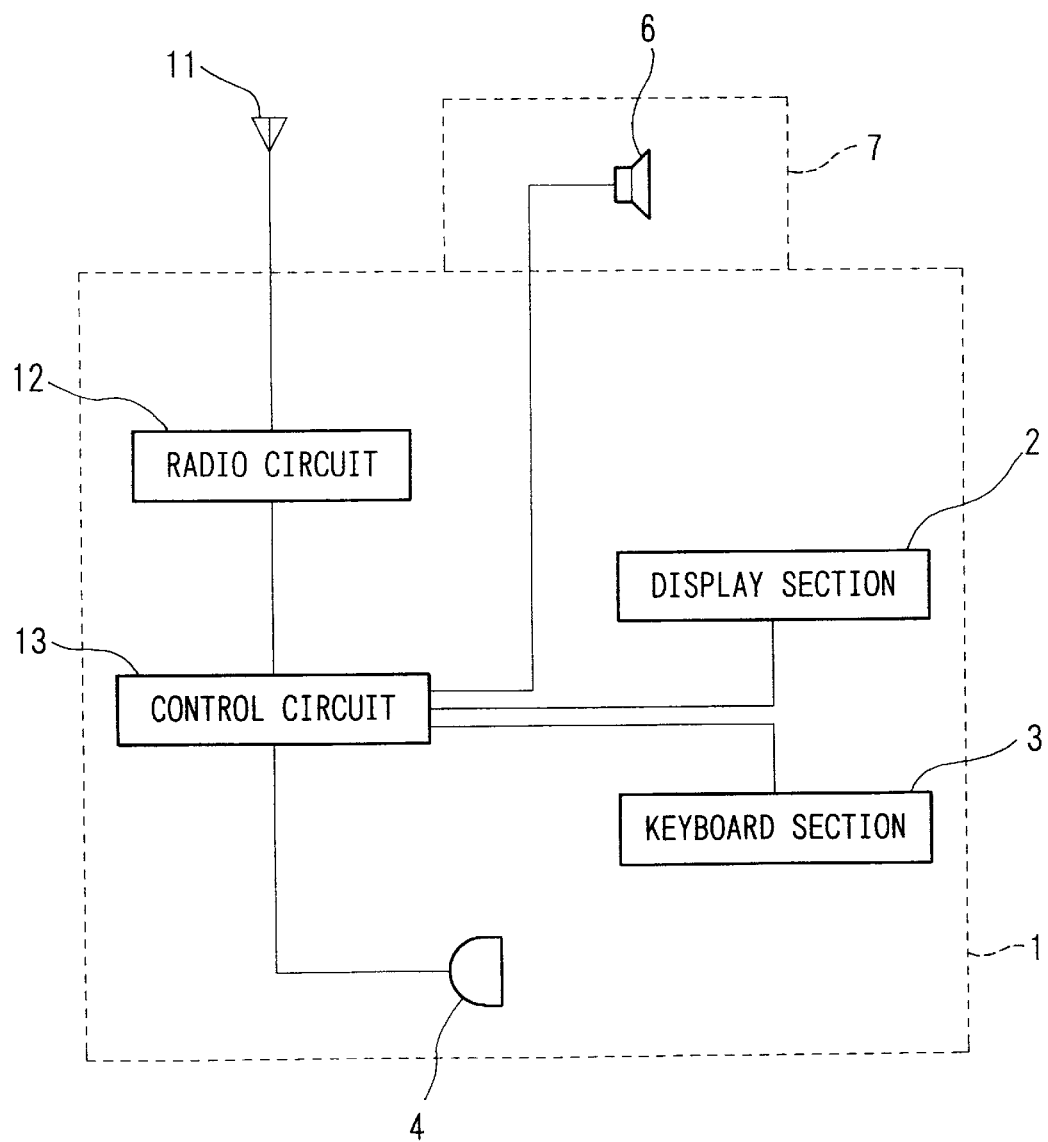
FIG. 2 is a block circuit diagram of the first embodiment of the portable phone device.

The configuration of the internal radio circuit of the phone device 18 is shown in FIG. 2. In more detail, the radio circuit 12 is operatively connected to the control circuit 13 and receives and transmits signals through the antenna 11. The control circuit 13 is also operatively connected to the display section 2, the keyboard section 3, transmission device 4 and the receiver device 6 to exchange signals among these component devices and circuits.

The control circuit 13 performs display operations for the display section 2 and signal exchange operations for the radio circuit 12 according to command signals from the keyboard section 3. A memory section is provided in the control circuit 13 to store various information input from the keyboard section 3, and the control section 13 displays various information stored in the memory section in the display section 2 according to the command from the keyboard section 3.

The movable member 7 can be rotated 180 degrees with respect to the function surface (i.e., the surface containing the keyboard section 3 and the display section 2), as shown in FIGS. 1B and 1C. When the movable member 7 is in the open position by being rotated 180 degrees about the hinge section 5, the length of the portable phone 18 is such as to position the receiver device 6 to correspond with an ear of the user, and the transmission device 4 to the mouth of the user.

On the other hand, when the movable member 7 is folded in the direction ② indicated by a bi-directional arrow, the overall length of the phone 18 becomes shorter, and since the movable member 7 has only the receiver device 6, the thickness of the section where the movable member 7 is folded does not become too thick, making the phone 18 a superior compact unit.

Furthermore, because the movable member 7 has only the receiver device 6, the length of the movable member 7 itself can be made short, and even when the movable member 7 is in the folded position, the keyboard section 3 does not become hidden from the view, and although a portion of the display section 2 is covered by the movable member 7, the lower portion of the display section 2 is visible to the user. Therefore, even while the movable member 7 is in the folded condition, it is possible to display a minimum amount of function keys to enable entering call number and other necessary data to contact the intended receiver. It is also permissible to arrange so that when the movable member 7 is in the folded position, all of the display section 2 and a portion of the keyboard section 3 are hidden in such a way that only the function keys are visibly accessible.

More specifically, in FIG. 1A, the region indicated by the reference numeral 2a is arranged to be a visible display section, and the region indicated by the reference numeral 2b is hidden from the view. In other words, the visible display section 2a is that region in the overall display section 2, which is visible to the user when the movable member 7 is in the folded position, and the not-visible display section 2b is that region whose visibility is blocked by the movable member 7.

The visible display section 2a is the essential date display area where the critical data such as caller telephone number, signal sensitivity, cell boundaries, remaining battery life and the presence of stored messages can be displayed even when the phone is in the carrying mode, not in the transmission mode.

The not-visible display section 2b is for displaying information, such as various functions and telephone numbers, which is necessary when the phone 18 is in the transmission mode.

In other words, the portable phone device 18 enables the user to view necessary information even when the movable member 7 is in the folded position for carrying, because a visible display section 2a of the display section 2 can be viewed by the user, without having to rotate the movable member 7 from the carrying position to the viewing position Also, as shown in FIG. 1A, the front and the back surfaces of the movable member 7 are provided, respectively, with acoustic holes 8, 9 so that regardless of whether the movable member 7 is in the closed or open position, the user is able to hear calling tones.

A second embodiment of the portable phone device will now be presented with reference to FIGS. 3A and 3B. FIG. 3A is a front view and FIG. 3B is a side view of the portable phone device.

The portable phone device 28, similar to the first embodiment of the portable phone device 18, comprises a casing member 1 and a movable member 7 which is rotatably joined to the casing member 1 through a transverse hinge section 5. The point of difference is that the keyboard section 3 is located on the side surface. Therefore, even when the movable member 7 is in the closed position, the essential keys are always exposed for ready accessibility. It can also be arranged so that the keyboard section 3 is located on the back surface of the casing member 1.

It should be noted that, in both first and second embodiments, it is not necessary to provide separate display section 2 and the keyboard section 3, because it would be possible to reduce the area occupied by the conventional display section 2 and the keyboard section 3 greatly, if the display section 2 and the keyboard section 3 can be combined into one unit by using a liquid crystal touch panel. In such a unit, both the keyboard and display sections can be exposed for viewing even when the movable member 7 is in the closed position.

Figures 4A, 4B:
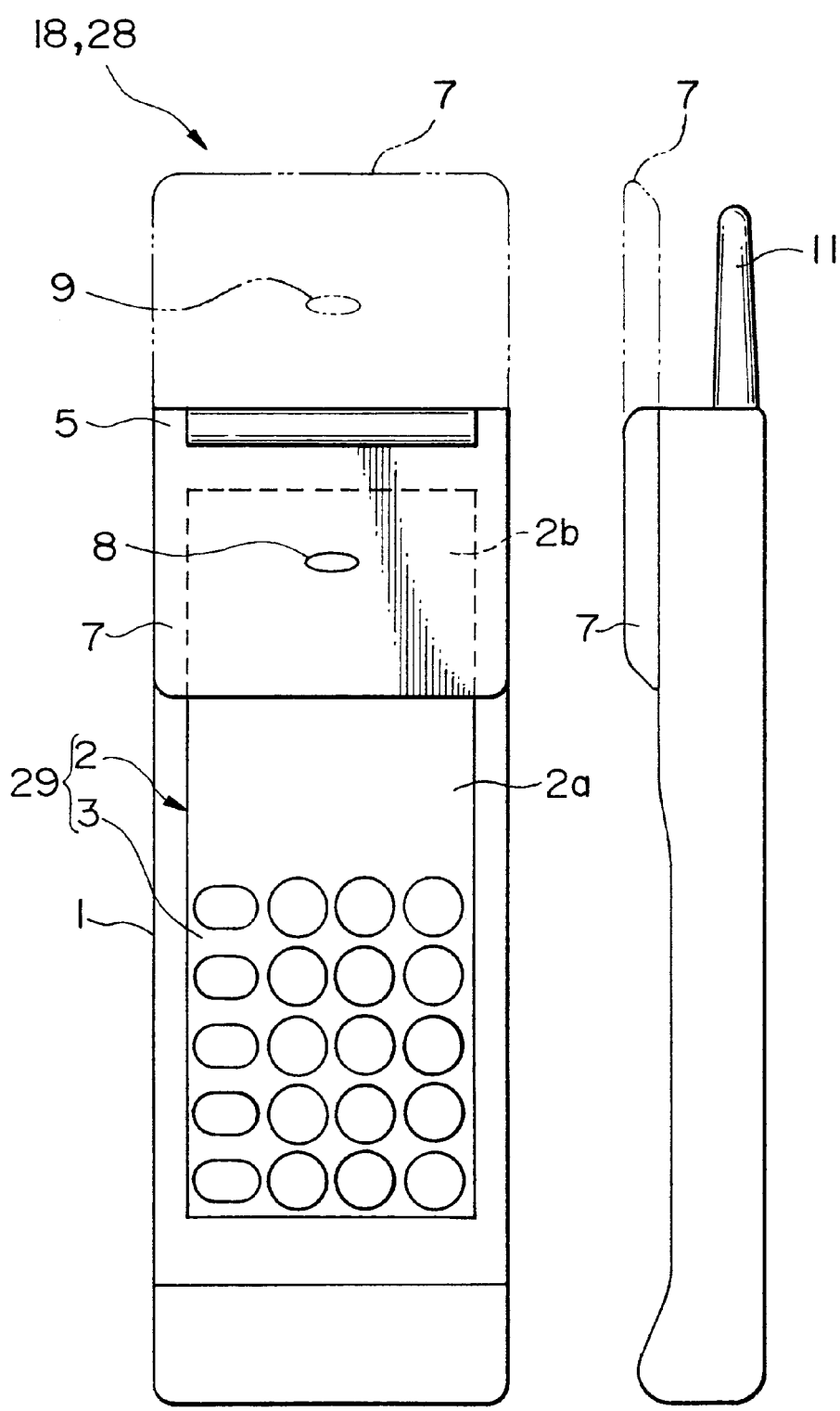
FIGS. 4A–4B are a plan view and a side view, respectively, of a variation of the second embodiment.

FIGS. 4A–4C show an example of such a portable phone device 28 comprising a liquid crystal touch panel section 29, having its display section 2 combined with its keyboard section 3, disposed on the front surface of the casing member 1. The liquid crystal touch panel section 29 combines the operations previously performed by the individual display section 2 and the keyboard section 3, and shows liquid crystal displays of the information normally exhibited by the display section 2 and the image of the keyboard on the same panel.

Figure 5:
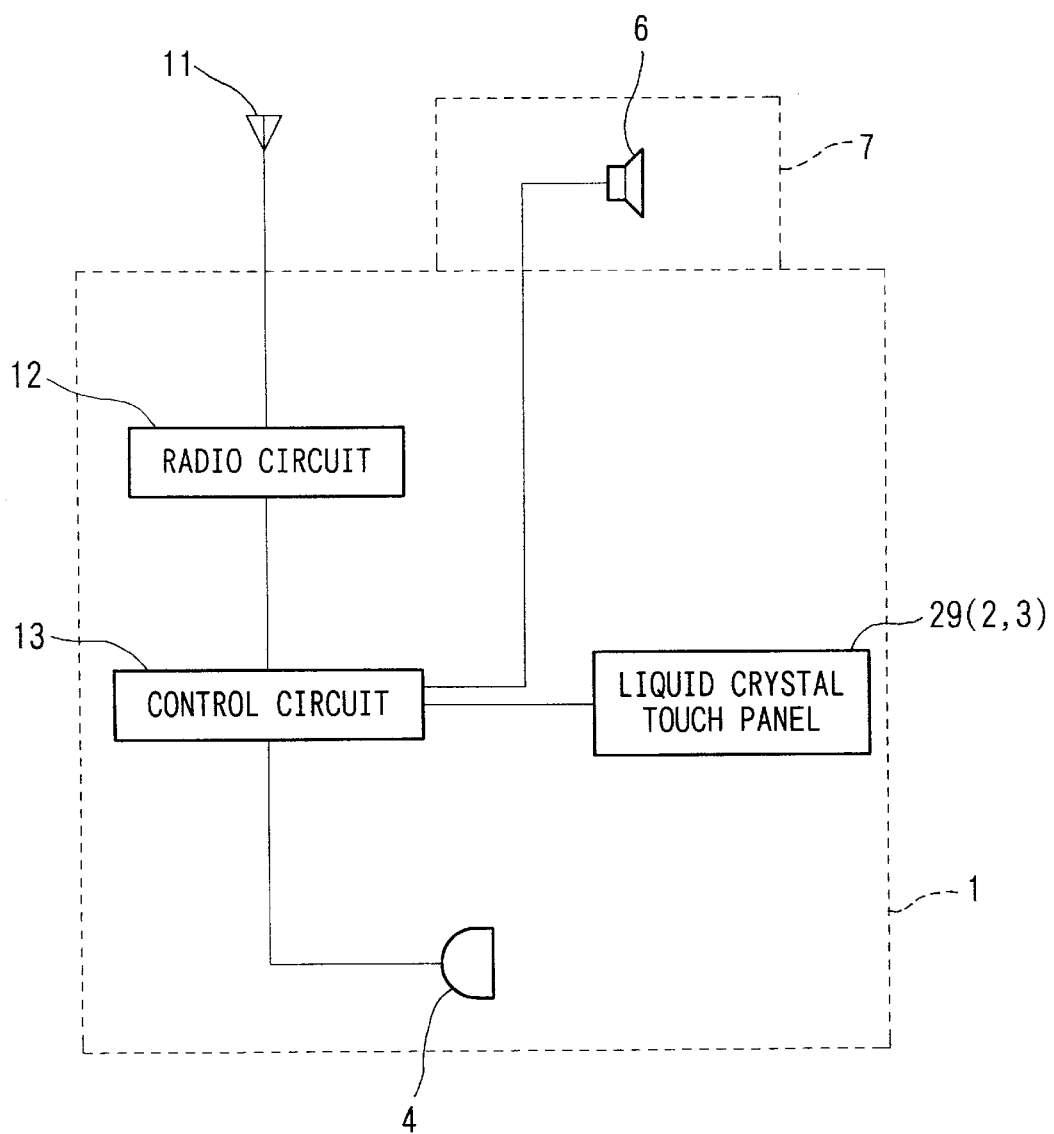
FIG. 5 is a block circuit diagram of a variation of the first and second embodiments of the portable phone device.
Figure 6:
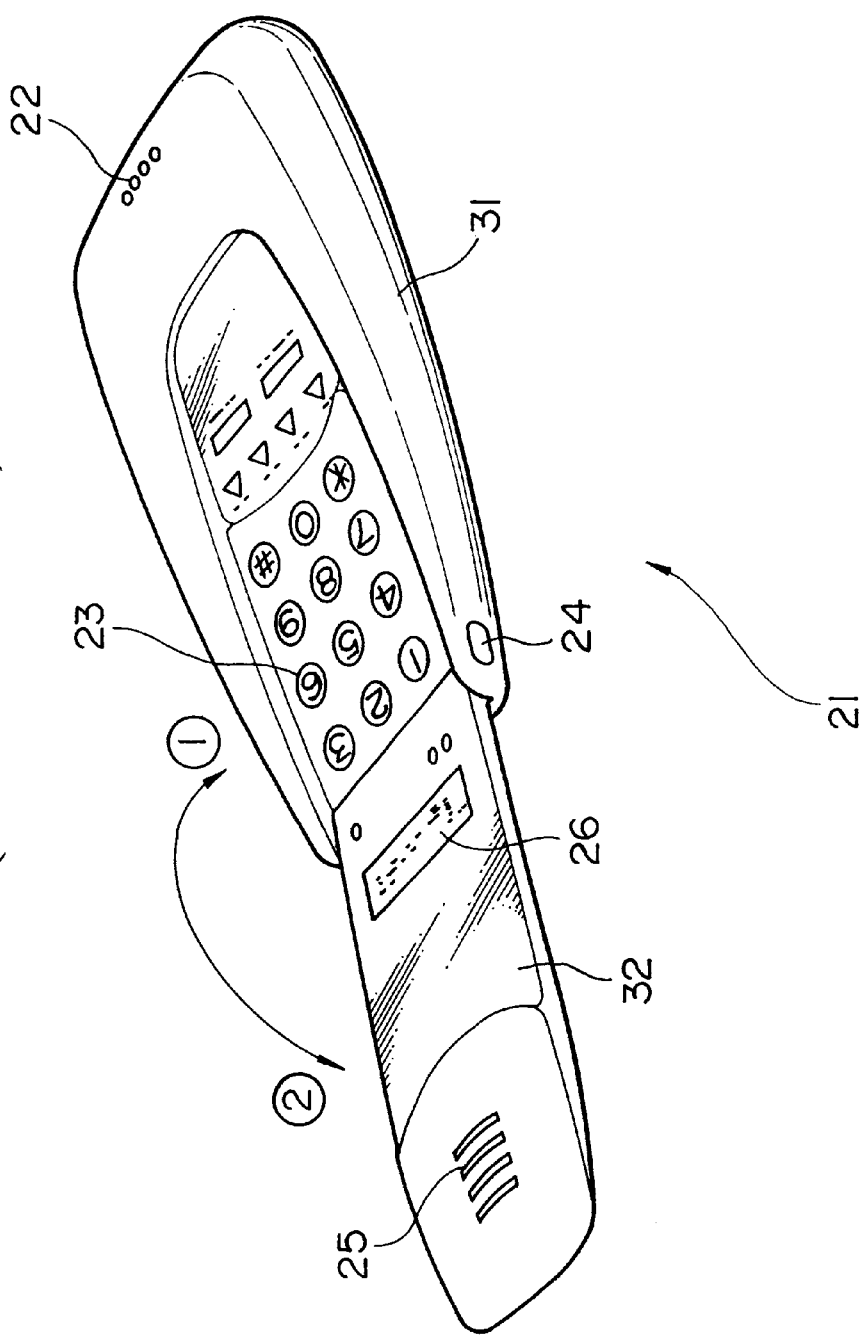
FIG. 6 is a perspective view of an example of the conventional portable phone.
Figure 7:
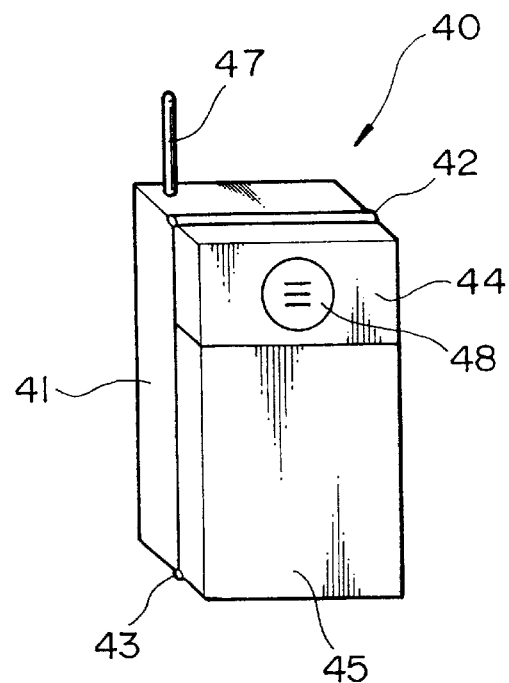
FIG. 7 is a perspective view of another example of the conventional portable phone in the folded condition.
Figure 8:
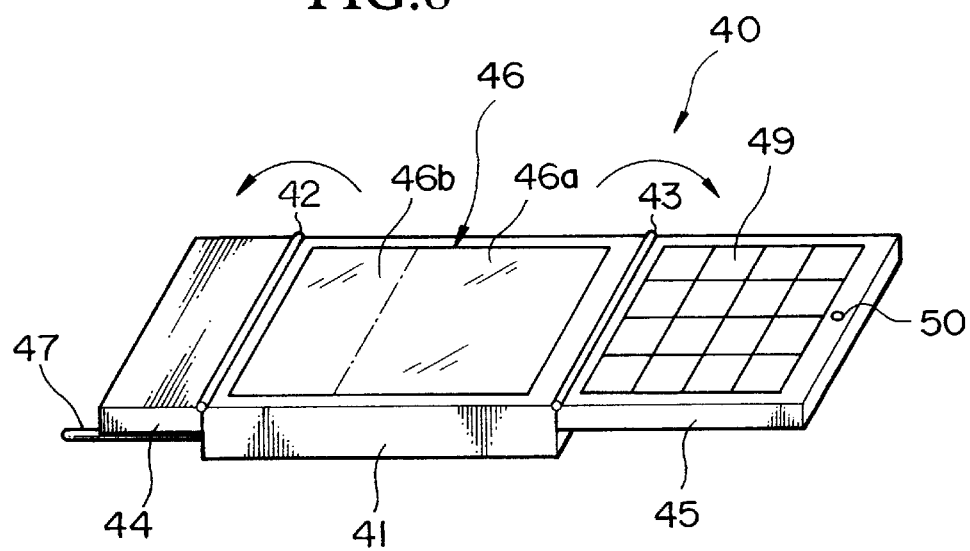
FIG. 8 is a perspective view of the portable phone shown in FIG. 7 in the unfolded condition.
Figure 9:
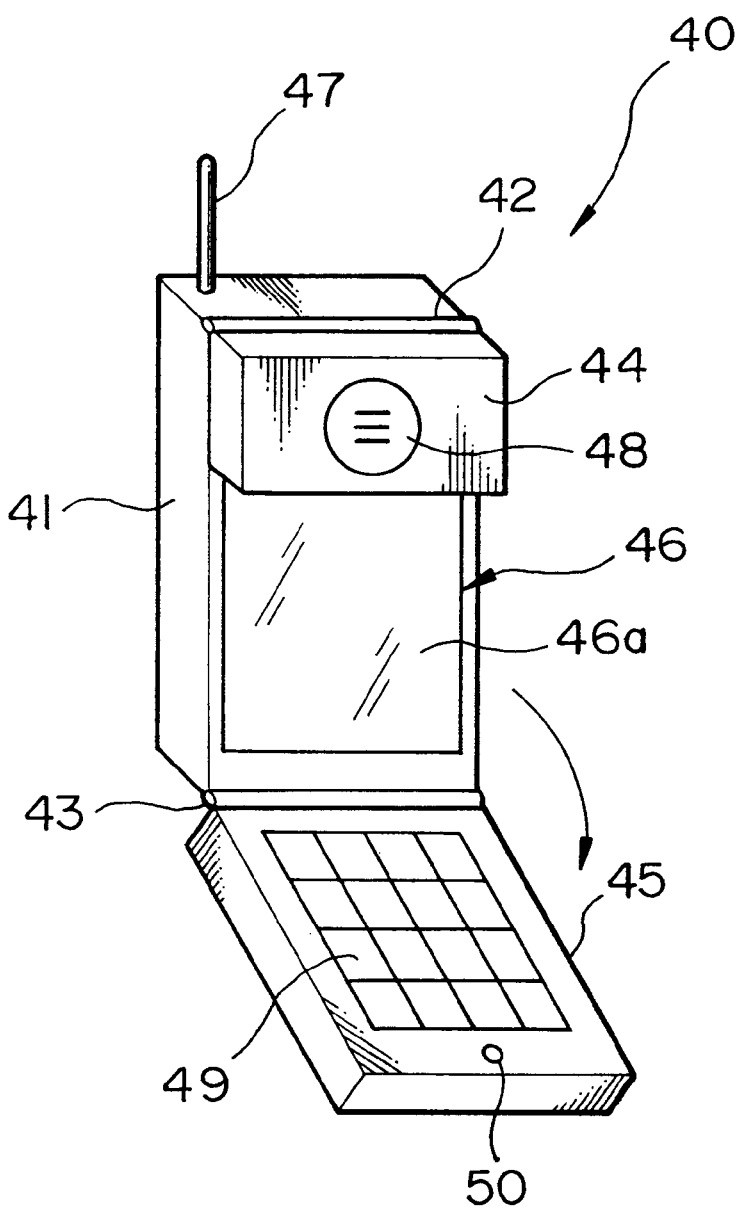
FIG. 9 is a perspective view of the portable phone shown in FIG. 7 in the receiving mode.

FIG. 5 shows a block diagram of the circuit configuration of the portable phone device 28. That is, the control circuit 13 is operatively connected to the liquid crystal touch panel section 29 so as to perform signal exchanges between the control circuit 13 and the liquid crystal touch panel section 29. In other words, data input operations are carried out by operating the keyboard section 3 displayed on the liquid crystal touch panel 29, and various information is displayed on the display section 2 of the liquid crystal touch panel section 29, according to the signals output by the control circuit 13. In this variation also, that region of the display section 2 which is visible when the movable member 7 is in the closed position is designated as visible display section 2a, and that region which is not-visible is designated as not-visible display section 2b. Also, it should be noted that it is not necessary that the battery 10, antennae 11, radio circuit 12 and the control circuit 13 (shown in FIG. 1C) be all packed into the casing member 1. These components can be distributed suitably between the casing member 1 and the movable member 7, so long as a minimum required area of the keyboard section 3 or the display section 2 can be exposed for viewing. The placement sequence of the keyboard section 3 and the display section 2 does not need to be restricted to those shown in these drawings.

The present invention has demonstrated that a folding configuration comprises first and second casing members which can be rotated with respect to a transverse rotation axis joining the first and second casing member in a hinged structure. The length dimensions of the first casing member is different from that of the second casing member in such a way that the overall length of the portable phone device is short when folded for carrying, and that a visible section is exposed for accessibility of function keys or display of essential information. The length dimensions of the casing members can be optimized for portability and functionality by distributing the display, keyboard, transmitting and receiving sections suitably between the two casing members. By so doing, the essential operations such as power on/off, mode switching and message dispatching can be carried out quickly and efficiently without opening the portable phone device.

What is claimed is:

1. A portable phone device comprising:
    a first casing member and a second casing member freely rotatably joined to said first casing member about a transverse rotation axis disposed in a plane containing said first casing member; and wherein
    said first casing member has disposed thereon at least a display section, a keyboard, and a transmitter section of a portable phone;
    said second casing has a receiver section which is provided thereon, said receiver section having acoustic holes formed on both surfaces of said second casing;
    said first casing has a dimension in a direction perpendicular to said rotation axis that is larger than said second casing;
    wherein a part of the display section disposed on said first casing is covered by closing said second casing.

2. A portable phone device according to claim 1, wherein a transverse width dimension of said first casing member is equal to a transverse width dimension of said second casing member.

3. A portable phone device according to claim 1, wherein said display section and said keyboard section provided in said first casing member are not disposed on a common surface.

4. A portable phone device according to claim 2, wherein said display section and said keyboard section provided in said first casing member are not disposed on a common surface.

5. A portable phone device according to claim 1, wherein said display section comprises liquid crystals, and said keyboard section is operated by touching a liquid crystal touch panel constituting a portion of said display section.

6. A portable phone device according to claim 2, wherein said display section comprises liquid crystals, and said keyboard section is operated by touching a liquid crystal touch panel constituting a portion of said display section.

7. A portable phone device according to claim 1, wherein said first casing member includes at least a portion of at least either said display section or said keyboard section, said portion being separated from said transverse rotation axis at a distance greater than a longitudinal length dimension of said second casing member.

8. A portable phone device according to claim 2, wherein said first casing member includes at least a portion of at least either said display section or said keyboard section, said portion being separated from said transverse rotation axis at a distance greater than a longitudinal length dimension of said second casing member.

9. A portable phone device according to claim 3, wherein said first casing member includes at least a portion of at least either said display section or said keyboard section, said portion being separated from said transverse rotation axis at a distance greater than a longitudinal length dimension of said second casing member.

10. A portable phone device according to claim 4, wherein said first casing member includes at least a portion of at least either said display section or said keyboard section, said portion being separated from said transverse rotation axis at a distance greater than a longitudinal length dimension of said second casing member.

11. A portable phone device according to claim 5, wherein said first casing member includes at least a portion of at least either said display section or said keyboard section, said portion being separated from said transverse rotation axis at a distance greater than a longitudinal length dimension of said second casing member.

12. A portable phone device according to claim 6, wherein said first casing member includes at least a portion of at least either said display section or said keyboard section, said portion being separated from said transverse rotation axis at a distance greater than a longitudinal length dimension of said second casing member.

* * * * *